(12) United States Patent
Tajima

(10) Patent No.: US 11,851,607 B2
(45) Date of Patent: Dec. 26, 2023

(54) POLYVINYL ALCOHOL-BASED RESIN AND PLUGGING AGENT FOR UNDERGROUND TREATMENT

(71) Applicant: KURARAY CO., LTD., Kurashiki (JP)

(72) Inventor: Yasuhiro Tajima, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 115 days.

(21) Appl. No.: 17/187,542

(22) Filed: Feb. 26, 2021

(65) Prior Publication Data

US 2021/0269700 A1 Sep. 2, 2021

(30) Foreign Application Priority Data

Feb. 27, 2020 (JP) .................................. 2020-031395

(51) Int. Cl.
*C08F 216/06* (2006.01)
*C09K 8/508* (2006.01)

(52) U.S. Cl.
CPC .......... *C09K 8/5083* (2013.01); *C08F 216/06* (2013.01); *C08F 2800/10* (2013.01); *C08F 2810/00* (2013.01)

(58) Field of Classification Search
CPC ....... C08F 216/06; C08F 116/06; C08F 16/06
See application file for complete search history.

(56) References Cited

U.S. PATENT DOCUMENTS

| | | | |
|---|---|---|---|
| 2012/0329950 A1* | 12/2012 | Kozuka | C08F 8/12 525/62 |
| 2017/0260309 A1* | 9/2017 | Collins | C08F 8/12 |
| 2020/0172796 A1 | 6/2020 | Tsuji et al. | |
| 2020/0317985 A1 | 10/2020 | Fujita et al. | |
| 2020/0325383 A1 | 10/2020 | Saka et al. | |

FOREIGN PATENT DOCUMENTS

| | | |
|---|---|---|
| WO | WO2019/031613 A1 | 2/2019 |
| WO | WO2019/131939 A1 | 7/2019 |
| WO | WO2019/131952 A1 | 7/2019 |

\* cited by examiner

*Primary Examiner* — Robert C Boyle
(74) *Attorney, Agent, or Firm* — Oblon, McClelland, Maier & Neustadt, L.L.P.

(57) ABSTRACT

Provided are a polyvinyl alcohol-based resin having an excellent plugging effect and a plugging agent for underground treatment. A polyvinyl alcohol-based resin is disclosed, in which a degree of swelling (%) when the polyvinyl alcohol-based resin is immersed in water at 40° C. for 30 minutes and a solubility (%) when the polyvinyl alcohol-based resin is immersed in water at 65° C. for 5 hours satisfy the degree of swelling/the solubility$\geq$3.0.

6 Claims, No Drawings

POLYVINYL ALCOHOL-BASED RESIN AND PLUGGING AGENT FOR UNDERGROUND TREATMENT

BACKGROUND OF THE INVENTION

Field of the Invention

This patent application claims priority under the Paris Convention based on Japanese Patent Application No. 2020-031395 (filed Feb. 27, 2020) incorporated herein by reference in its entirety.

The present disclosure relates to a polyvinyl alcohol-based resin and a plugging agent for underground treatment.

Description of the Related Art

When petroleum and other underground resources are recovered from an underground natural resource layer, there is a problem that a recovery rate of these resources is low, and various methods have been used to improve this. As a typical method, there is a method of injecting a liquid into an underground oil field layer to perform replacement. As the liquid, salt water, fresh water, steam, or the like is used, and steam is particularly useful.

As an example, a method of injecting steam into an underground shale layer to cause cracks is widely adopted. In this method, first, a vertical hole (vertical well) over several thousand meters underground is drilled vertically with a drill, and when the drill reaches the shale layer, a horizontal hole (horizontal well) with a diameter of tens to several tens of centimeters is drilled horizontally. Next, a crack (fracture) is formed from the well using a pressurized steam in the vertical well and the horizontal well, and natural gas, petroleum (shale gas, oil), and the like flowing out from the crack are recovered.

At this time, in order to grow the already formed crack to a larger size or to generate more cracks, a plugging agent (additive) for underground treatment may be used to temporarily fill a portion of the already formed crack. When a fracturing fluid filled in the well is pressurized in that state, the fluid invades into another crack, causing the existing crack to grow largely, and a new crack can be formed.

Since a plugging agent for underground treatment (also called diverting agent) is used to temporarily close a crack as described above, the shape can be maintained for a certain period of time to close the crack, and then, when natural gas, petroleum, or the like is collected, the plugging agent that is hydrolyzed and disappear or the plugging agent that is dissolved and removed may be used.

For example, there is an example in which polyvinyl alcohol is used as the plugging agent for underground treatment, and WO 2019/031613 discloses a diverting agent containing a polyvinyl alcohol-based resin.

WO 2019/131939 discloses a diverting agent containing resin particles of a polyvinyl alcohol-based resin having a specific particle size.

WO 2019/131952 discloses a sealing material for underground treatment that contains a polyvinyl alcohol-based resin whose swelling ratio after immersion in water at a temperature of 80° C. for 30 minutes is within a specific range.

Since the plugging agent for underground treatment is used to temporarily close the crack formed in the shale layer, it is desirable that the plugging agent swells under certain conditions and has a high plugging effect. When a dissolution rate in water is moderately lower, the plugging effect is more long-lasting and effective.

The present disclosure has been made in view of the above, and an object of the present disclosure is to provide a polyvinyl alcohol-based resin having an excellent plugging effect and a plugging agent for underground treatment.

SUMMARY OF THE INVENTION

As a result of diligent studies to solve the above-mentioned problems, the present inventor has found that the above-mentioned problems can be solved by a polyvinyl alcohol-based resin satisfying a specific relationship between a degree of swelling and solubility, so as to complete the present invention.

That is, the present disclosure is a polyvinyl alcohol-based resin, in which the degree of swelling (%) when the polyvinyl alcohol-based resin is immersed in water at 40° C. for 30 minutes and the solubility (%) when the polyvinyl alcohol-based resin is immersed in water at 65° C. for 5 hours satisfy the degree of swelling/the solubility$\geq$3.0.

At this time, a polyvinyl alcohol-based resin having a degree of swelling (%) of 110% or more and 280% or less is preferable.

Further, at this time, a polyvinyl alcohol-based resin having a solubility (%) of 5% or more is preferable.

Furthermore, at this time, a polyvinyl alcohol-based resin comprising a structural unit containing a carboxylic acid is preferable.

The present disclosure is a plugging agent for underground treatment comprising the polyvinyl alcohol-based resin.

The present disclosure can provide the polyvinyl alcohol-based resin having an excellent plugging effect and the plugging agent for underground treatment.

DETAILED DESCRIPTION OF THE INVENTION

Hereafter, configurations of the present invention are described in detail but these are merely examples of preferred modes of embodiment, and the present invention is not specified by the content thereof.

[Polyvinyl Alcohol-Based Resin]

The present disclosure is a polyvinyl alcohol (hereinafter, polyvinyl alcohol may be referred to as PVA)-based resin satisfying a specific relationship between a degree of swelling and solubility, and in the PVA-based resin, a value obtained by dividing the degree of swelling (%) when the PVA-based resin is immersed in water at 40° C. for 30 minutes by the solubility (%) when the PVA-based resin is immersed in water at 65° C. for 5 hours, that is, the degree of swelling/the solubility, is 3.0 or more.

The degree of swelling/the solubility of the PVA-based resin is preferably 3.2 or more, more preferably 4.5 or more, further preferably 10 or more, and particularly preferably 20 or more. The degree of swelling/the solubility of the PVA-based resin is preferably 100 or less, more preferably 50 or less, further preferably 40 or less, and particularly preferably 30 or less. The degree of swelling/the solubility of the PVA-based resin is preferably 3.0 or more and 100 or less, more preferably 3.0 or more and 50 or less, and further preferably 3.2 or more and 30 or less. When the degree of swelling/the solubility is within the above range, a swelling property is high, a plugging effect is excellent, and a dissolution rate is moderately low, so that the plugging effect is maintained.

The degree of swelling in the present disclosure is a rate of increase in volume of the PVA-based resin after the PVA-based resin is immersed in water, and is measured by the following method.

0.5 g of PVA-based resin is placed in a test tube with an inner diameter of 18 mm, and a height occupied by the PVA-based resin in the test tube is measured and taken as a height A. Next, 7 mL of distilled water is placed in the test tube, and the mixture is shaken well to disperse the PVA-based resin. After that, the test tube is immersed in a water bath set at 40° C., and after the water temperature in the test tube reaches 40° C., the test tube is allowed to stand for 30 minutes. Then, the height occupied by the PVA-based resin in the test tube is measured and taken as the height B. From the obtained heights A and B, the degree of swelling (%) is calculated according to the following formula:

$$\text{degree of swelling (\%)} = (\text{height } B/\text{height } A) \times 100$$

From the viewpoint of the effect of temporarily closing a crack, the degree of swelling of the PVA-based resin is preferably 100% or more, more preferably 110% or more, further preferably 120% or more, even more preferably 180% or more, particularly preferably 200% or more, and more particularly preferably 250% or more. Further, the degree of swelling of the PVA-based resin is preferably 300% or less, more preferably 280% or less, and further preferably 270% or less. Furthermore, the degree of swelling of the PVA-based resin is preferably 110% or more and 280% or less.

The solubility in the present disclosure is a ratio at which the PVA-based resin dissolves when the PVA-based resin is immersed in water, and is measured by the following method.

100 g of distilled water is placed in a 200 mL glass container with a lid, 6 g of PVA-based resin is put and immersed, and the container is allowed to stand in a constant temperature bath at 65° C. for 5 hours. After that, the contents of the glass container are passed through a 120 nylon mesh (sieve with a mesh opening of 125 microns), the PVA-based resin remaining on the sieve is dried at 140° C. for 3 hours, and the weight is then measured and taken as the weight A. On the other hand, the PVA-based resin is separately dried at 105° C. for 3 hours, a weight before drying (weight B) and a weight after drying (weight C) are measured, and the solubility (%) is calculated according to the following formula.

$$\text{Solid fraction (\%)} = (\text{weight } C/\text{weight } B) \times 100$$

$$\text{Solubility (\%)} = \{6 - (\text{weight } A \times 100/\text{solid fraction})\}/6 \times 100$$

From the viewpoint that the dissolution rate of the PVA-based resin is moderately low, the plugging effect is maintained, and the dissolution and removal are easy, the solubility of the PVA-based resin is more than 0, preferably 5% or more, and more preferably 10% or more. Further, the solubility of the PVA-based resin is preferably less than 50%, and more preferably 30% or less. Furthermore, the solubility of the PVA-based resin is preferably more than 0 and less than 50%, and more preferably 5% or more and 30% or less.

If the solubility of the PVA-based resin is 0, that is, if the PVA-based resin does not substantially dissolve in water at 65° C. or is extremely slow to dissolve, when the PVA-based resin is used as a plugging agent for underground treatment, the plugging agent stays in the crack for a long time, and may not be effective in terms of production efficiency in the recovery of underground resources such as natural gas and petroleum.

In the present disclosure, in order to increase the degree of swelling/the solubility of the PVA-based resin to 3.0 or more, for example, in a saponification step in a production process of the PVA-based resin, it is effective to saponify polyvinyl ester in a slurry state in a large excess alcohol solution. In such a method, a PVA-based resin having a structure in which mesopores are developed can be obtained, and the degree of swelling/the solubility of the PVA-based resin can be increased.

The saponification in the slurry state can be performed by, for example, the following method.

Polyvinyl acetate is added to methanol in an amount 2 to 4 weight-times that of the polyvinyl acetate, and an anhydrous sodium methylate/methanol solution (catalyst amount is 0.1 to 5% by weight based on polyvinyl acetate) is added as a saponification catalyst. The mixed slurry liquid is heated to near the boiling point (usually 53 to 65° C.) to allow the saponification reaction to proceed. Then, a reaction product is filtered off and heated and washed to obtain a PVA-based resin.

When polyvinyl ester is saponified using an alkali catalyst, a neutralization treatment with an acid or the like is performed in order to remove an alkaline compound (for example, sodium salt) that normally exists after the saponification. However, if this neutralization treatment is not performed, or if the neutralization treatment is not completely performed, a PVA-based resin containing a residual alkali compound can be obtained, whereby the degree of swelling/the solubility of the PVA-based resin can be adjusted within the scope of the present disclosure. It is presumed that this is because a residual alkali compound content in the PVA-based resin moderately enhances water solubility.

The shape of the PVA-based resin of the present disclosure is not particularly limited, and may be a shape such as pellets, granules, or powder. A usual method such as an extrusion molding method can be adopted for pelletization, and at that time, a plasticizer such as polyethylene glycol described later may be appropriately added.

When the PVA-based resin in a powder form is used, its average particle size is preferably 10 to 5000 μm, more preferably 50 to 4000 μm, further preferably 100 to 3500 μm, and particularly preferably 500 to 3000 μm.

When the average particle size of the PVA-based resin is within the above range, the PVA-based resin does not scatter, for example, and is easier to handle. For example, even when the PVA-based resin is later modified, the reaction becomes uniform and tends to be better. The average particle size is a diameter at which an integrated value (cumulative distribution) is 50% after measuring a volume distribution for each particle size by laser diffraction.

A saponification degree of the PVA-based resin (measured according to JIS K 6726) is preferably 70 mol % or more, more preferably 90 mol % or more, further preferably 95 mol % or more, and particularly preferably 98 mol % or more. Furthermore, the saponification degree of the PVA-based resin is preferably 99.9 mol % or less, more preferably 99.8 mol % or less, and further preferably 99.5 mol % or less from the viewpoint of production efficiency.

When the saponification degree of the PVA-based resin is within the above range, the solubility of the PVA-based resin can be reduced more moderately, the temporary closing of the crack, which is the role of the plugging agent for underground treatment, can be carried out more efficiently, dispersibility of the PVA-based resin in water becomes better, and the dissolution and removal after use becomes easier.

An average degree of polymerization of the PVA-based resin is preferably 150 or more and 4000 or less, and more preferably 200 or more and 3000 or less. In this specification, the average degree of polymerization of the PVA-based resin is calculated from a viscosity of a 4% by mass aqueous solution at 20° C. measured in accordance with JIS K 6726.

From the viewpoint of the plugging effect, a specific surface area of the PVA-based resin is preferably 1.0 m$^2$/g or more, more preferably 1.1 m$^2$/g or more, and further preferably 1.5 m$^2$/g or more. Furthermore, the specific surface area of the PVA-based resin is preferably 3.0 m$^2$/g or less, and more preferably 2.0 m$^2$/g or less.

The specific surface area of the present disclosure is a value obtained by a nitrogen gas adsorption method, and in the PVA-based resin that has been subjected to a vacuum drying treatment at about 60° C. for about 15 hours as a pretreatment, the specific surface area is calculated from a BET plot of nitrogen molecules adsorbed on a pore of the PVA-based resin.

Specifically, about 3 to 5 g of PVA-based resin is sampled in a measurement cell and dried under reduced pressure for about 15 hours at a temperature of about 60° C. using VacPrep061 manufactured by Shimadzu Corporation, Micromeritics Instrument Corporation. After that, a value of the specific surface area can be obtained by measuring the specific surface area (measurement lower limit 0.01 m$^2$/g) by the nitrogen gas adsorption method using TriStarII3020 manufactured by Shimadzu Corporation, Micromeritics Instrument Corporation.

The PVA-based resin of the present disclosure may be an unmodified PVA-based resin or a modified PVA-based resin.

The PVA-based resin can be produced, for example, by polymerizing a vinyl ester-based monomer such as vinyl acetate and then saponifying the polymer obtained. When the PVA-based resin is a modified PVA-based resin, the PVA-based resin can be produced by, for example, copolymerizing a vinyl ester-based monomer with another unsaturated monomer copolymerizable with the vinyl ester-based monomer and then saponifying the copolymer obtained.

Examples of the vinyl ester-based monomer include vinyl formate, vinyl acetate, vinyl propionate, vinyl valerate, vinyl caprate, vinyl laurate, vinyl stearate, vinyl benzoate, vinyl pivalate, and vinyl versatate. Among these vinyl ester-based monomers, vinyl acetate is preferable.

Examples of the above-mentioned another unsaturated monomer copolymerizable with the vinyl ester-based monomer include olefins such as ethylene, propylene, isobutylene, α-octene, α-dodecene, and α-octadecene; unsaturated acids such as acrylic acid, methacrylic acid, crotonic acid, maleic acid, maleic anhydride, itaconic acid, and undecylenic acid, and salts thereof, monoesters thereof, and dialkyl esters thereof; nitriles such as acrylonitrile and methacrylonitrile; amides such as diacetone acrylamide, acrylamide, and methacrylamide; olefin sulfonic acids such as an ethylene sulfonic acid, an allyl sulfonic acid, a methallyl sulfonic acid or a salt thereof; alkyl vinyl ethers; N-acrylamide methyltrimethylammonium chloride; allyltrimethylammonium chloride; dimethylallylvinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth) acrylates such as polyoxyethylene (meth)acrylate and polyoxypropylene (meth) acrylate; polyoxyalkylene (meth) acrylamides such as polyoxyethylene (meth)acrylamide and polyoxypropylene (meth)acrylamide; polyoxyethylene (1-(meth)acrylamide-1,1-dimethylpropyl) ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; hydroxy group-containing α-olefins such as 3-buten-1-ol, 4-penten-1-ol, and 5-hexen-1-ol, and acylated products thereof; vinylethylene carbonate; 2,2-dialkyl-4-vinyl-1,3-dioxolane; glycerin monoallyl ether; vinyl compounds such as 3,4-diacetoxy-1-butene; isopropenyl acetate; substituted vinyl acetates such as 1-methoxyvinyl acetate; 1,4-diacetoxy-2-butene; and vinylene carbonate.

Among them, the PVA-based resin obtained by being copolymerized with an unsaturated monomer such as unsaturated acids, salts thereof, monoesters thereof, or dialkyl esters thereof has a structural unit containing carboxylic acid and therefore is more excellent in water solubility, and this PVA-based resin is preferable because it dissolves more moderately when used as a plugging agent for underground treatment and has a small environmental load.

When the PVA-based resin of the present disclosure is a modified PVA-based resin, a modification rate in this modified PVA-based resin, that is, a content of a structural unit derived from "another unsaturated monomer copolymerizable with the vinyl ester-based monomer" to all the constituent units constituting the modified PVA-based resin is preferably from 0.5 mol % to 10 mol %, more preferably from 0.7 mol % to 8 mol %, and further preferably from 1.0 mol % to 5 mol %

The modification rate in the modified PVA-based resin can be determined from a <1>H-NMR spectrum (solvent: DMSO-d6, internal standard: tetramethylsilane) of a PVA-based resin having a saponification degree of 100 mol %. Specifically, the modification rate can be calculated based on peak area derived from a hydroxy proton, a methine proton, and a methylene proton in the modifying group, a methylene proton in the main chain, a proton of a hydroxy group linked to the main chain, and the like.

The PVA-based resin of the present disclosure may be a mixture with another different PVA-based resin, and examples of such another PVA-based resins include: resins having different modification rates; resins having different saponification degrees; resins having different average degrees of polymerization; resins in which other copolymerization components (other unsaturated monomers copolymerizable with vinyl ester-based monomers) are different, and resins distinguished from one by the presence or absence of other copolymerization components. When the PVA-based resin is a mixture, the average values of the saponification degree, the average degree of polymerization, and the modification rate are preferably within the above ranges.

[Plugging Agent for Underground Treatment]

The plugging agent for underground treatment of the present disclosure contains the PVA-based resin described above. Although the content of the PVA-based resin is not particularly limited, the content of the PVA-based resin is preferably 50 to 100% by mass, more preferably 80 to 100% by mass, and further preferably 90 to 100% by mass, based on a total amount of the plugging agent for underground treatment. When the content of the PVA-based resin is within the above range, the plugging effect tends to be more pronounced.

The plugging agent for underground treatment of the present disclosure enters into a crack formed in excavation for petroleum, shale gas, etc. and temporarily closes the crack, whereby a new crack can be formed. As a method of closing a crack using the plugging agent for underground treatment of the present disclosure, the plugging agent for underground treatment may be placed on a flow of fluid in a well and flowed into the crack to be closed.

Although the plugging agent for underground treatment of the present disclosure temporarily closes a crack in a ground, the plugging agent gradually dissolves in water and is removed during or after recovery of underground resources such as petroleum and natural gas, and therefore, the plugging agent does not stay in the ground for a long time. Thus, the plugging agent for underground treatment of the present disclosure has an extremely low burden on the environment.

The plugging agent for underground treatment of the present disclosure may further contain additives. Example of additives include fillers, plasticizers, and starch.

By mixing the filler with the PVA-based resin, mechanical properties may be able to be further improved, and a water-solubility rate may be able to be adjusted. Although an amount of the filler added can be appropriately selected depending on an intended purpose, for example, the amount of the filler is preferably 50% by weight or less, more preferably 30% by weight or less, and further preferably 5% by weight or less of the total of the plugging agent.

A specific gravity of the plugging agent for underground treatment is preferably close to the specific gravity of the fluid used in the underground treatment, so that the plugging agent can be more uniformly distributed in a system by, for example, a pump power. From the viewpoint of adjusting the specific gravity of the plugging agent for underground treatment, a bulking agent may be added to the PVA-based resin. The specific gravity of the PVA-based resin can be increased by adding the bulking agent. Examples of bulking agents include natural minerals and salts of inorganic and organic substances, and may be, for example, a compound of one or two or more metal ions selected from the group consisting of calcium, magnesium, silicon, barium, copper, zinc and manganese and one or two or more counter ions selected from the group consisting of fluorides, chlorides, bromides, carbonates, hydroxides, formates, acetates, nitrates, sulfates, and phosphates. Among these, calcium carbonate, calcium chloride, zinc oxide and the like are preferable.

A plasticizer can be added to the PVA-based resin to improve fluid properties of the plugging agent for underground treatment. At this time, in order to uniformly add the plasticizer, a method of spraying and coating a surface of the PVA-based resin with the plasticizer can be used. By adding the plasticizer, it may be possible to further suppress generation of a fine powder. Known plasticizers can be used, and suitable plasticizers include water, glycerol, polyglycerol, ethylene glycol, polyethylene glycol, ethanolacetamide, ethanolformamide, triethanolamine acetate, glycerin, trimethylolpropane, neopentyl glycol, and two or more of them.

Plasticizers in a solid or crystal form at room temperature, such as trimethylolpropane, can be used for spray coating by dissolving in water or other liquids. An amount of the plasticizer added is preferably 40% by weight or less, more preferably 30% by weight or less, and further preferably 20% by weight or less, based on the weight of the PVA-based resin.

When the plugging agent for underground treatment is a composition of the PVA-based resin and an additive, as a mixing ratio of the composition, the amount of the PVA-based resin is preferably 60 to 94% by weight, the amount of the filler is preferably 5 to 40% by weight, and the amount of the plasticizer is preferably 1 to 15% by weight.

In the plugging agent for underground treatment of the present disclosure, a starch may be mixed with the PVA-based resin. The amount of starch added is preferably 10 to 90% by weight, and more preferably 30% by weight or more of the total of the PVA-based resin. Examples of starch include natural products, synthetic products, and physically and chemically modified starches.

In addition, other additives such as chelating agents, pH adjusters, oxidizing agents, lost circulation materials, anti-scale agents, rust preventives, clays, iron agents, reducing agents, and oxygen removing agents can be used as needed.

EXAMPLES

Hereinafter, the present invention will be specifically described based on examples. However, the present invention is not limited to these examples. In the examples, "parts" and "%" are on a mass basis unless otherwise specified.

Example 1

Polyvinyl acetate obtained by copolymerizing 5 mol % of methyl acrylate was used as a raw material. This was added as a 33% methanol solution to a reaction vessel, and a methanol solution of anhydrous sodium methylate was added thereto. An amount of anhydrous sodium methylate was 0.5% by weight of polyvinyl acetate. The reaction vessel was heated while stirring the solution, and the saponification reaction was carried out by holding the solution at the boiling point to obtain a slurry liquid. The obtained slurry liquid was taken out from the reaction vessel and sent to a cold/heat treatment step as it was without neutralization treatment, and the temperature of the slurry liquid was lowered to less than 50° C. Then, in a solid-liquid separation step, the slurry liquid was separated into a wet cake of a polyvinyl alcohol-based resin and a solution. Then, only the wet cake was taken out and dried to obtain a PVA-based resin (PVA1) which was an aggregate of powder or granular material. The viscosity of PVA1 in a 4% aqueous solution at 20° C. was 19 mPa s, the saponification degree was 99.5 mol %, and the specific surface area was 1.74 $m^2$/g. PVA1 which was the obtained powder or granular material passed through a US100 mesh (ASTM E11 standard). The particle size of the particles passing through the US100 mesh is 149 μin or less.

Example 2

1.5% by weight of polyethylene glycol was added to PVA1 and kneaded. Then, using a twin-screw extrusion molding machine, the mixture was extruded into a sheet-like shape at a molding pressure of 1259 psi. This was put into a granulator and granulated to a size of 6/8 mesh (ASTM E11 standard) to obtain a PVA-based resin (PVA2). The specific surface area of PVA2 was 1.18 $m^2$/g. The expression "granulation to a size of 6/8 mesh" means granulation to a particle size that particles pass through 6 mesh and do not pass through 8 mesh, and the particle size of particles granulated to a size of 6/8 mesh is 2380 μm or more and 3350 μm or less.

Example 3

A PVA-based resin (PVA3) which was an aggregate of powder or granular material was obtained by the same method as in Example 1 except that polyvinyl acetate not copolymerized with methyl acrylate was used as a raw material. The viscosity of PVA3 in a 4% aqueous solution at 20° C. was 31 mPa s, the saponification degree was 99.5 mol %, and the specific surface area was 1.72 m²/g. PVA3 which was the obtained powder or granular material passed through a US100 mesh (ASTM E11 standard).

Example 4

1.5% by weight of polyethylene glycol was added to PVA3 and kneaded, and then extruded into a sheet-like shape at a molding pressure of 1250 psi using a twin-screw extrusion molding machine, and thereafter, this was put into a granulator and granulated to a size of 6/8 mesh to obtain a PVA-based resin (PVA4). The specific surface area of PVA4 was 1.10 m²/g.

Comparative Example 1

A methanol solution of unmodified polyvinyl acetate (concentration 32% by mass) was mixed with a methanol solution of sodium hydroxide (concentration 4% by mass) as a saponification catalyst solution. The resulting mixture was placed on a belt, and the saponification reaction in a homogeneous system was proceeded under a temperature condition of 40° C. After that, neutralization treatment with acetic acid, preliminary crushing, drying, and main crushing were performed, and the resulting particles were passed through a 12-mesh (JIS standard) sieve at an outlet of a crusher at the time of main crushing to obtain a PVA-based resin (PVA5). The viscosity of the obtained PVA5 in a 4% aqueous solution at 20° C. was 22.5 mPa s, and the saponification degree was 88.0 mol %. The specific surface area of PVA5 was less than the lower limit of measurement (0.01 m²/g). PVA5 passed through a US100 mesh (ASTM E11 standard).

Comparative Example 2

1.5% by weight of polyethylene glycol was added to PVA5 and kneaded, and then extruded into a sheet-like shape at a molding pressure of 1250 psi using a twin-screw extrusion molding machine, and thereafter, this was put into a granulator and granulated to a size of 6/8 mesh to obtain a PVA-based resin (PVA6). The specific surface area of PVA6 was less than the lower limit of measurement (0.01 m²/g).

Comparative Example 3

PVA7 was a reproduction of the PVA-based resin described in Example 1 of WO 2019/131952. The specific surface area of PVA7 was less than the lower limit of measurement (0.01 m²/g).

The degree of swelling (%) and solubility (%) of the obtained PVAs 1 to 7 were measured by the following methods, and the plugging effect was evaluated. The results are shown in Table 1. As for PVA7, no dissolution was observed in the solubility evaluation, so that the plugging effect was not evaluated.

<Degree of Swelling>

0.5 g of PVA-based resin was placed in a test tube with an inner diameter of 18 mm, and the height occupied by the PVA-based resin in the test tube was measured (height A). Next, 7 mL of distilled water was placed in the test tube, and the mixture was shaken well to disperse PVA. After that, the test tube was immersed in a water bath set at 40° C., and after the water temperature in the test tube reached 40° C., the test tube was allowed to stand for 30 minutes. Then, the height occupied by the PVA-based resin in the test tube was measured (height B). From the numerical values of the obtained heights A and B, the degree of swelling (%) was calculated according to the following formula:

degree of swelling (%)=(height $B$/height $A$)×100

<Solubility>

100 g of distilled water was placed in a 200 mL glass container with a lid, 6 g of PVA-based resin was put, and the container was allowed to stand in a constant temperature bath at 65° C. for 5 hours. After that, the contents of the glass container were passed through a 120 nylon mesh (sieve with a mesh opening of 125 microns), the PVA-based resin remaining on the sieve was dried at 140° C. for 3 hours, and the weight after drying was measured (weight A). On the other hand, the PVA-based resin separately sampled was dried at 105° C. for 3 hours, the weight before drying (weight B) and the weight after drying (weight C) were measured, and the solubility (%) of the PVA-based resin was calculated according to the following formula.

Solid fraction (%)=(weight $C$/weight $B$)×100

Solubility (%)={6−(weight $A$×100/solid fraction)}/6× 100

<Plugging Effect Confirmation Test>

A 120-mesh stainless steel sieve was placed in a stainless steel column with an inner diameter of 10 mm, and 5 g of PVA-based resin was placed on the upstream side. Next, warm water adjusted to 50° C. was placed in a column, and a pressure of 100 psi was applied. The column was visually observed, and the plugging effect was evaluated as "Good" when an outflow of hot water stopped within 15 seconds and evaluated as "NG" when the outflow of hot water did not stop within 15 seconds.

TABLE 1

| | PVA | Mesh | Solubility (%) | Degree of swelling (%) | Degree of swelling/ solubility | Plugging effect |
|---|---|---|---|---|---|---|
| Example 1 | PVA1 | ≤100 | 26 | 120 | 4.6 | Good |
| Example 2 | PVA2 | 6/8 | 82 | 268 | 3.3 | Good |
| Example 3 | PVA3 | ≤100 | 17 | 200 | 11.8 | Good |
| Example 4 | PVA4 | 6/8 | 8 | 189 | 23.6 | Good |
| Comparative Example 1 | PVA5 | ≤100 | 53 | 105 | 2.0 | NG |
| Comparative Example 2 | PVA6 | 6/8 | 50 | 100 | 2.0 | NG |
| Comparative Example 3 | PVA7 | — | 0 | 300 | — | NG |

In the PVA-based resins of Examples 1 to 4, a value of the degree of swelling/the solubility was 3.0 or more, and the PVA-based resins were superior in performance as a plugging agent as compared with the PVA-based resins of Comparative Examples 1 to 3. The PVA-based resins of Examples 1 to 4 are water-soluble, and the plugging agent for underground treatment containing such a PVA-based resin gradually dissolves in water while temporarily closing a crack in the ground, and is removed during or after recovery of underground resources such as petroleum and natural gas. Therefore, the plugging agent does not stay in the ground for a long time, and the burden on the environment can be reduced.

The polyvinyl alcohol-based resin of the present disclosure can be suitably used as the plugging agent for underground treatment. That is, the polyvinyl alcohol-based resin enters into a crack formed in excavation for underground resources such as petroleum and shale gas, temporarily closes the crack, and thereby can contribute to efficiency of formation of a new crack. Since the plugging agent for underground treatment of the present disclosure gradually dissolves in water and is removed during recovery of underground resources and after use, the plugging agent contributes to improvement of efficiency of recovery of underground resources and has a small environmental load.

What is claimed is:

1. A polyvinyl alcohol-based resin, comprising:
a saponified polyvinyl ester having saponification degree of from 70 mol % to 99.9 mol %; and
saponification catalyst which is not neutralized;
wherein
the polyvinyl alcohol-based resin is in the shape of pellets, granules or powder, and
a degree of swelling (%) when the polyvinyl alcohol-based resin is immersed in water at 40° C. for 30 minutes and a solubility (%) when the polyvinyl alcohol-based resin is immersed in water at 65° C. for 5 hours satisfy the degree of swelling/the solubility≥3.0.

2. The polyvinyl alcohol-based resin according to claim 1, wherein the degree of swelling (%) is from 110% to 280%.

3. The polyvinyl alcohol-based resin according to claim 1, wherein the solubility (%) is 5% or more.

4. The polyvinyl alcohol-based resin according to claim 1, further comprising a structural unit containing a carboxylic acid.

5. A plugging agent for underground treatment, comprising the polyvinyl alcohol-based resin according to claim 1.

6. The polyvinyl alcohol-based resin according to claim 1, wherein the saponified polyvinyl ester comprises from 0.5 mol % to 10 mol % of an unsaturated monomer copolymerizable with the vinyl ester monomer of the polyvinyl ester.

* * * * *